(12) United States Patent
Kannan

(10) Patent No.: US 10,078,489 B2
(45) Date of Patent: Sep. 18, 2018

(54) VOICE INTERFACE TO A SOCIAL NETWORKING SERVICE

(71) Applicant: Microsoft Technology Licensing, LLC, Redmond, WA (US)

(72) Inventor: Ashvin Kannan, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 343 days.

(21) Appl. No.: 14/569,867

(22) Filed: Dec. 15, 2014

(65) Prior Publication Data

US 2015/0186110 A1   Jul. 2, 2015

Related U.S. Application Data

(60) Provisional application No. 61/921,876, filed on Dec. 30, 2013.

(51) Int. Cl.
| | |
|---|---|
| *G06F 3/16* | (2006.01) |
| *H04L 29/06* | (2006.01) |
| *H04W 4/21* | (2018.01) |

(52) U.S. Cl.
CPC .......... *G06F 3/167* (2013.01); *H04L 65/1069* (2013.01); *H04W 4/21* (2018.02); *H04L 65/403* (2013.01)

(58) Field of Classification Search
CPC ................................................ G06F 17/30545
See application file for complete search history.

(56) References Cited

U.S. PATENT DOCUMENTS

| | | | | |
|---|---|---|---|---|
| 6,771,756 B1 * | 8/2004 | Chou | ...................... | G06Q 10/10 379/201.01 |
| 7,436,939 B1 * | 10/2008 | Packingham | ..... | H04M 3/42059 379/88.12 |
| 8,131,745 B1 * | 3/2012 | Hoffman | ............... | G06Q 10/107 707/766 |
| 8,943,047 B1 * | 1/2015 | Carpio | ................... | G06Q 10/06 707/723 |
| 9,373,145 B2 * | 6/2016 | Ur | ........................... | G06Q 10/10 |
| 2007/0043687 A1 * | 2/2007 | Bodart | ................. | G06Q 10/107 |
| 2008/0046976 A1 * | 2/2008 | Zuckerberg | ........... | H04L 63/102 726/4 |

(Continued)

OTHER PUBLICATIONS

"Social and Personal Holistic Insight with One Query", Jul. 22, 2013, IP.com Disclosure No. IPCOM000229321D, pp. 1-4.*

*Primary Examiner* — Ryan F Pitaro

(74) *Attorney, Agent, or Firm* — Schwegman Lundberg & Woessner, P.A.

(57) ABSTRACT

A machine may be configured to generate and provide, for example, a voice-user interface to a social networking service. The voice-user interface may enable a member of the social networking service to access member profile information for other members of the social networking service. Using the voice-user interface, a first member of the social networking service can speak a natural language command or request to receive an aural response that includes information regarding a second member of the social networking service. In this manner, the first member can request and receive specific member profile information of a second member. In another aspect, the first member can record audio notes to be assigned to his or her own member profile or assigned to a member profile of the second member. The first member may subsequently use the voice-user interface to have such audio notes played back when desired.

19 Claims, 7 Drawing Sheets

(56) References Cited

U.S. PATENT DOCUMENTS

| | | | |
|---|---|---|---|
| 2009/0106415 A1* | 4/2009 | Brezina | H04M 15/00 709/224 |
| 2009/0117883 A1* | 5/2009 | Coffing | H04L 12/5895 455/414.1 |
| 2009/0276419 A1* | 11/2009 | Jones | G06F 17/30637 |
| 2010/0114989 A1* | 5/2010 | Cormode | G06F 17/3053 707/808 |
| 2011/0066630 A1* | 3/2011 | Balduccini | G06F 17/30023 707/766 |
| 2011/0119593 A1* | 5/2011 | Jacobson | G06Q 30/02 715/736 |
| 2011/0141855 A1* | 6/2011 | Gault | G06Q 10/109 368/10 |
| 2011/0196802 A1* | 8/2011 | Ellis | G06F 17/30654 705/321 |
| 2011/0202594 A1* | 8/2011 | Ricci | H04M 3/4931 709/203 |
| 2011/0246512 A1* | 10/2011 | Lubarski | G06Q 10/10 707/769 |
| 2012/0005221 A1* | 1/2012 | Ickman | G06F 17/30528 707/769 |
| 2012/0131009 A1* | 5/2012 | Nath | G06F 17/30867 707/741 |
| 2012/0290603 A1* | 11/2012 | Ickman | G06F 17/30867 707/769 |
| 2013/0054238 A1* | 2/2013 | Bodell | G10L 15/22 704/235 |
| 2013/0097124 A1* | 4/2013 | de Souza | G06Q 10/10 707/692 |
| 2013/0158984 A1* | 6/2013 | Myslinski | G06F 17/28 704/9 |
| 2013/0185285 A1* | 7/2013 | Shuman | G06F 17/30554 707/722 |
| 2013/0262501 A1* | 10/2013 | Kuchmann-Beauger | G06F 17/30958 707/769 |
| 2013/0275320 A1* | 10/2013 | Moore | G06Q 10/1053 705/321 |
| 2013/0297284 A1* | 11/2013 | Choi | G06F 17/28 704/2 |
| 2013/0339443 A1* | 12/2013 | Goldman | H04L 65/403 709/204 |
| 2014/0017646 A1* | 1/2014 | Seitzberg, III | G09B 19/00 434/236 |
| 2014/0082074 A1* | 3/2014 | Workman | H04L 67/10 709/204 |
| 2014/0164927 A1* | 6/2014 | Salaverry | H04N 1/2112 715/727 |
| 2014/0164994 A1* | 6/2014 | Myslinski | G06F 1/163 715/808 |
| 2014/0172732 A1* | 6/2014 | Baladi | G06Q 10/1053 705/321 |
| 2014/0222823 A1* | 8/2014 | Hegde | G06Q 30/0201 707/740 |
| 2014/0236663 A1* | 8/2014 | Smith | G06Q 10/0633 705/7.27 |
| 2014/0279798 A1* | 9/2014 | Purohit | G06Q 10/101 706/47 |
| 2014/0317502 A1* | 10/2014 | Brown | G06F 9/4446 715/706 |
| 2015/0089401 A1* | 3/2015 | Ta | G06F 17/30867 715/753 |
| 2015/0139508 A1* | 5/2015 | Ye | G06K 9/00892 382/116 |
| 2015/0205842 A1* | 7/2015 | Jain | G06F 17/30289 707/732 |
| 2015/0248225 A1* | 9/2015 | Goyal | G06F 3/04842 715/747 |
| 2016/0104200 A1* | 4/2016 | Osotio | G06Q 30/0267 705/14.64 |
| 2016/0132198 A1* | 5/2016 | Sinclair | G06F 3/0482 715/739 |
| 2016/0203237 A1* | 7/2016 | Whitnah | G06F 17/30646 707/722 |

* cited by examiner

US 10,078,489 B2

VOICE INTERFACE TO A SOCIAL NETWORKING SERVICE

RELATED APPLICATION

This application claims the priority benefit of U.S. Provisional Patent Application No. 61/921,876, filed Dec. 30, 2013, which is incorporated herein by reference in its entirety.

TECHNICAL FIELD

The subject matter disclosed herein generally relates to machines that are configured to process data (e.g., data processing systems). Specifically, the present disclosure addresses systems, methods, and computer program products that facilitate generation of provision of a voice interface (e.g., a voice-activated user interface or other user interface that supports spoken commands) to a social networking service.

BACKGROUND

When a user of a social networking service first registers to become a member of the social networking service, the user is typically prompted to provide a variety of personal or biographical information. Such information may include the person's full name, a picture (e.g., photograph) of the person, information about the person's current employment status (e.g., name of employer, industry of employer, current job title, and skills), information about the person's formal education (e.g., schools attended and degrees earned), and information about the person's interests generally. All of this information may be aggregated and stored to form what is commonly referred to as a profile, or member profile, of the member of the social networking service. Typically, each member of the social networking service has his or her own member profile, which may be presented in a member profile page. Although a member may establish access privileges that control what specific information is available for others (e.g., other members or the general public) to view, typically at least some (e.g., all) of the information included in a member's profile will be available for view by other members, non-member users, or both.

As a member uses the social networking service over time, the member may add information to his or her member profile (e.g., periodically, continuously, or otherwise repeatedly). For example, the member may update his or her profile to reflect his or her current employment status as the member leaves one employment position and takes on another. As the member unilaterally or bilaterally connects with (e.g., "follows" or "friends") other members and organizations (e.g., companies or schools) represented in the social networking service, these associations (e.g., relationships) may be added to the member's profile and may consequently appear in the member's profile page. The member may add skills to his or her member profile (e.g., to highlight his or her special talents and expertise). The member may be endorsed by other members generally, and may have one or more of his or her skills endorsed specifically. Because the member's profile may represent the member's identify within the social networking service, the social networking services may form all or part of an ideal tool for searching, browsing, and researching people.

When the member's profile is viewed with a web browser application (e.g., executing on a laptop or desktop computer), the size of the display is typically not considered as a limiting factor, and thus the amount and nature of member profile information that can be presented at one time may have few bounds. Accordingly, the member profile page that presents the corresponding member profile on a display of a desktop computer or laptop computer may be configured to provide a very data-rich and feature-rich experience. However, on a mobile computing device (e.g., a smart phone or tablet computer), the display size typically limits the amount of information that can be presented on at one time (e.g., on one page or other user interface). Accordingly, when viewing a member's profile page on a mobile device, the experience may seem inferior when compared to the full desktop computer experience. Furthermore, many smart phones and tablet computers have touch-screen displays (e.g., with few physical buttons, if any), which may make data input burdensome. Consequently, accessing a member's profile information with a mobile computing device while on the move may be challenging. For those with a visual impairment, operating a mobile computing device via a touch screen interface may be impossible.

Furthermore, it may be helpful to review an individual's member profile (e.g., by viewing his or her member profile page) just prior to attending a meeting with that individual. However, with a busy schedule, taking the time to sit down and thoroughly review a member's profile page right before a meeting with that individual is not always an option. Operating a mobile computing device to access a member's profile page while traveling (e.g., driving to a meeting) may be difficult (if not impossible) and potentially dangerous. Consequently, it may be beneficial to provide a simpler interface for accessing information from a member profile, as well as information from other social networking applications.

BRIEF DESCRIPTION OF THE DRAWINGS

Some embodiments are illustrated by way of example and not limitation in the figures of the accompanying drawings.

FIG. 7 is a block diagram illustrating components of a machine, according to some example embodiments, able to

DETAILED DESCRIPTION

Figure 1:
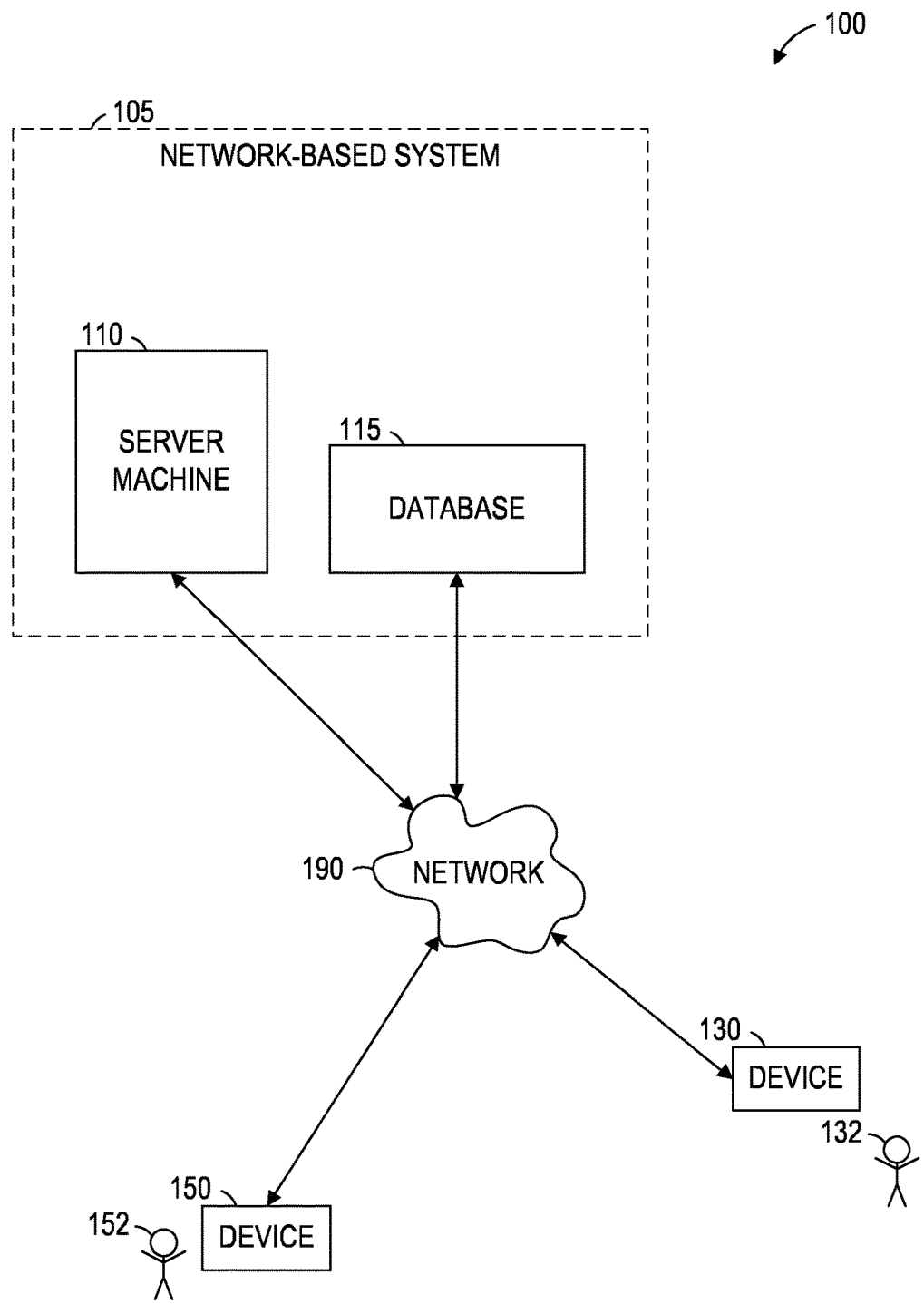
FIG. 1 is a network diagram illustrating a network environment suitable for generating and providing an voice interface to a social networking service, consistent with some example embodiments.

Example methods and systems are directed to machines, processes, and computer program products that individually facilitate provision of an voice interface to a social networking service (e.g., generating and providing a voice-activated user interface for the social networking service). Such machines, processes, and computer program products may each individually implement any one or more the methodologies described herein. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A social networking service may be configured to generate and provide an voice interface for interacting with the social networking service. The voice interface may be or include a voice-activated user interface (e.g., a voice-user interface) configured to enable one or more users of the social networking service to, among other things, request information with simple, natural language, spoken commands, and receive information in response (e.g., visual information, aural information, or any suitable combination thereof). For example, via a mobile application residing and executing on a mobile computing device (e.g., a smart phone or tablet computer), a user (e.g., a member of the social networking service) can invoke or initiate a voice-user interface for the social networking service. According to some embodiments, the user may access the voice-user interface by dialing a particular telephone number. In certain example embodiments, the user may speak a command (e.g., a short word or phrase) into the microphone of the mobile computing device or telephone, such as "give me a summary of Bob Smith's member profile." In response to the spoken command, the voice-user interface may present the user with a spoken summary of various member profile details (e.g., highlights or other descriptors) for the member who is named Bob Smith.

In some embodiments, one or more of the spoken commands can be natural language commands. A command interpreter (e.g., command interpreting logic or other command interpreting module) within the voice-user interface may be configured to use one or more natural language processing techniques to semantically understand what is being requested and to convert the spoken command into an appropriate data request (e.g., in machine language or other machine-readable code). Accordingly, in addition to requesting a member profile summary, the user may speak one or more commands to request a wide variety of specific information regarding a specified member of the social networking service. For example, a user may submit a question, request, or command, and the system will understand the user's submission and provide a reply. Examples of such submissions include:

"When did I last communicate with Bob Smith?"
"Where does Bob Smith currently work?"
"Where did Bob Smith last work?
"What connections do I share in common with Bob Smith?"
"Where did Bob Smith go to school?"
"Has Bob Smith been endorsed by any members?"
"What skills does Bob Smith have?"

The above examples are non-limiting examples of the many different commands that can be interpreted and for which the voice-user interface can generate meaningful answers based on a member's profile.

In some example embodiments, the command interpreter is configured to utilize a wide variety of contextual information to provide a conversational experience, and to properly identify the profile of the member for which information is being requested. The member may be a person or an entity (e.g., company, school, or organization). For example, when a command includes a common name (e.g., "Bob Smith") shared by many members of the social networking service, the command interpreter may access and use a variety of information to identify the particular Bob Smith that is the subject of the request. The command interpreter may access calendar event data within a personal calendar of the requesting user (e.g., the user who spoke the command) For instance, if an email address, name or other personal identifying information is included in a calendar event—particularly a calendar event for an event that is upcoming or has just passed—this information can be used to disambiguate the common name and identify the correct member profile (e.g., the member profile of the correct member). Moreover, the requesting user's social graph may also be used in disambiguating a common name. For instance, if there are two members with the name "Bob Smith," and the requesting user is a direct connection of one of the two members named "Bob Smith," then there is generally a greater likelihood that the requesting user is referring to the Bob Smith that is the direct connection than the Bob Smith who is not a direct connection. The network distance (e.g., social network distance, which may be measured in links or hops) between members in the social graph may also be used to disambiguate a common name. For example, a second-degree connection (e.g., a connection of a connection, a follower of a follower, or a friend of a friend) is more likely to be the subject of a request (e.g., the spoken command) than a third-degree connection (e.g., a connection of a connection of a connection, a follower of a follower of a follower, or a friend of a friend of a friend) or a fourth-degree connection (e.g., a connection of a connection of a connection of a connection, a follower of a follower of a follower of a follower, or a friend of a friend of a friend of a friend).

In some example embodiments, a user's monitored or tracked activity may be used as contextual information for disambiguating a name (e.g., identifying a particular intended member from those members having the same name). For example, if a user performs a search from his or her desktop computer using a common name, such as "Bob Smith", and then selects to view a member profile of a particular Bob Smith (e.g., among multiple members named "Bob Smith"), the selection and viewing of that particular member profile may be used to subsequently disambiguate a spoken command relating to information about "Bob Smith" (e.g., spoken command that contains the phrase "Bob Smith"). Similarly, a context management module may be used to monitor and track spoken commands, as well as the user's other interactions with the social networking service, so that each command can be used as contextual information in interpreting any subsequent command For example, if a user first requests a summary of a member profile for a member by saying, "Give me Bob Smith's profile summary . . . ", when the user follows up with a second spoken command, "who does he work for now?," the context management module may be configured to interpret the pronoun "he" as meaning "Bob Smith" (e.g., the same Bob Smith referenced in the first spoken command).

In situations where disambiguation is difficult, for example, because two members share a common name, and the various signals used in disambiguating the two members do not provide a clear means for identifying the particular member that is being referenced in a spoken command, the command interpreting module may cause the voice-user interface to simply respond with a question, such as, "Are you referring to the Bob Smith who works at ACME Products?," or "Are you referring to the Bob Smith who resides in the San Francisco Bay Area?" Then, by speaking a "yes" or "no" answer, the requesting user can provide additional information to assist in identifying the correct member, and the social networking service can provide the proper information regarding the proper member.

In some example embodiments, the provided response to the spoken command received via the voice-user interface will be an aural response (e.g., recorded speech, synthesized speech, a recorded sound, a synthesized sound, or any suitable combination thereof). The response may be or include a notification displayed by a mobile application (e.g., a mobile alert), an email, a presentation of information via a graphical user interface on a mobile computing device, or any suitable combination thereof. In various instances, one or more of the above responses may be provided to a particular spoken command. For example, in response to receiving a request, such as "When did I last communicate with Bob Smith?", the voice-user interface may provide a spoken answer, such as "You last emailed with Bob Smith on January 14th of 2014," while simultaneously retrieving and displaying an email thread for an email exchange between the requesting user and Bob Smith. Because the context management module may be configured to provide or otherwise facilitate conversational interaction with the social networking service, the requesting user may then provide a further spoken command to have an email, email thread, or other content and communications read back to the user.

In some example embodiments, the voice-user interface additionally provides a user with the ability to record, store, and retrieve audio notes. For example, a member may record an audio note in order to annotate another member's profile with important, personal facts that the recording member would like to remember. For instance, the recording member may invoke an audio note service and record a note about another member, such as "Bob Smith worked on a sales transaction with Jeff Johnson of ACME Products in September of 2012, and Bob has two kids that attend school with my son Phil—Greg, age 7, and Jane, age 5." The audio note can then be associated with the member profile of the other member —in this case, the member named Bob Smith—but will only be accessible to the member who has recorded the audio note.

In another instance, the recording member may record an audio note and make the recorded note available to others (e.g., other members)—for example, all members, only first-degree connections, only first-degree and second-degree connections, etc. For example, the recording member may record an audio note that provides a short summary that quickly defines a person, profession, product, service, organization, or event, as well as the value proposition thereof (e.g., an "elevator pitch" for the person, profession, product, service, organization, or event). Accordingly, when a first member is scheduled to meet with another member (e.g., Bob Smith), the first member, using his or her mobile computing device, can use the voice-user interface to request that the previously recorded summary (e.g., elevator pitch) for the other member (e.g., Bob Smith) be played back. For example, the first member may speak a command, such as "Play Bob Smith's elevator pitch," and in response, the voice-user interface to the social networking service may play the recorded audio note back to the requesting first member. These and other aspects and benefits are presented and described in detail in connection with the descriptions of the figures that follow.

FIG. 1 is a network diagram illustrating a network environment 100 suitable for generating and providing an voice interface to a social networking service, consistent with some example embodiments. The network environment 100 includes a server machine 110, a database 115, and devices 130 and 150, all communicatively coupled to each other via a network 190. The server machine 110 may form all or part of a network-based system 105 (e.g., a cloud-based server system configured to provide one or more social networking services to one or more of the devices 130 and 150). The server machine 110 and the devices 130 and 150 may each be implemented in a computer system, in whole or in part, as described below with respect to FIG. 7.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases, or devices shown in FIG. 1 may be implemented in a special-purpose computer that has been modified (e.g., configured or programmed) by software (e.g., one or more software modules) to perform one or more of the functions described herein for that machine, database, or device. For example, a computer system able to implement any one or more of the methodologies described herein is discussed below with respect to FIG. 7. As used herein, a "database" is a data storage resource and may store data structured as a text file, a table, a spreadsheet, a relational database (e.g., an object-relational database), a triple store, a hierarchical data store, or any suitable combination thereof Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof The network 190 may include one or more portions that constitute a private network, a public network (e.g., the Internet), or any suitable combination thereof Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
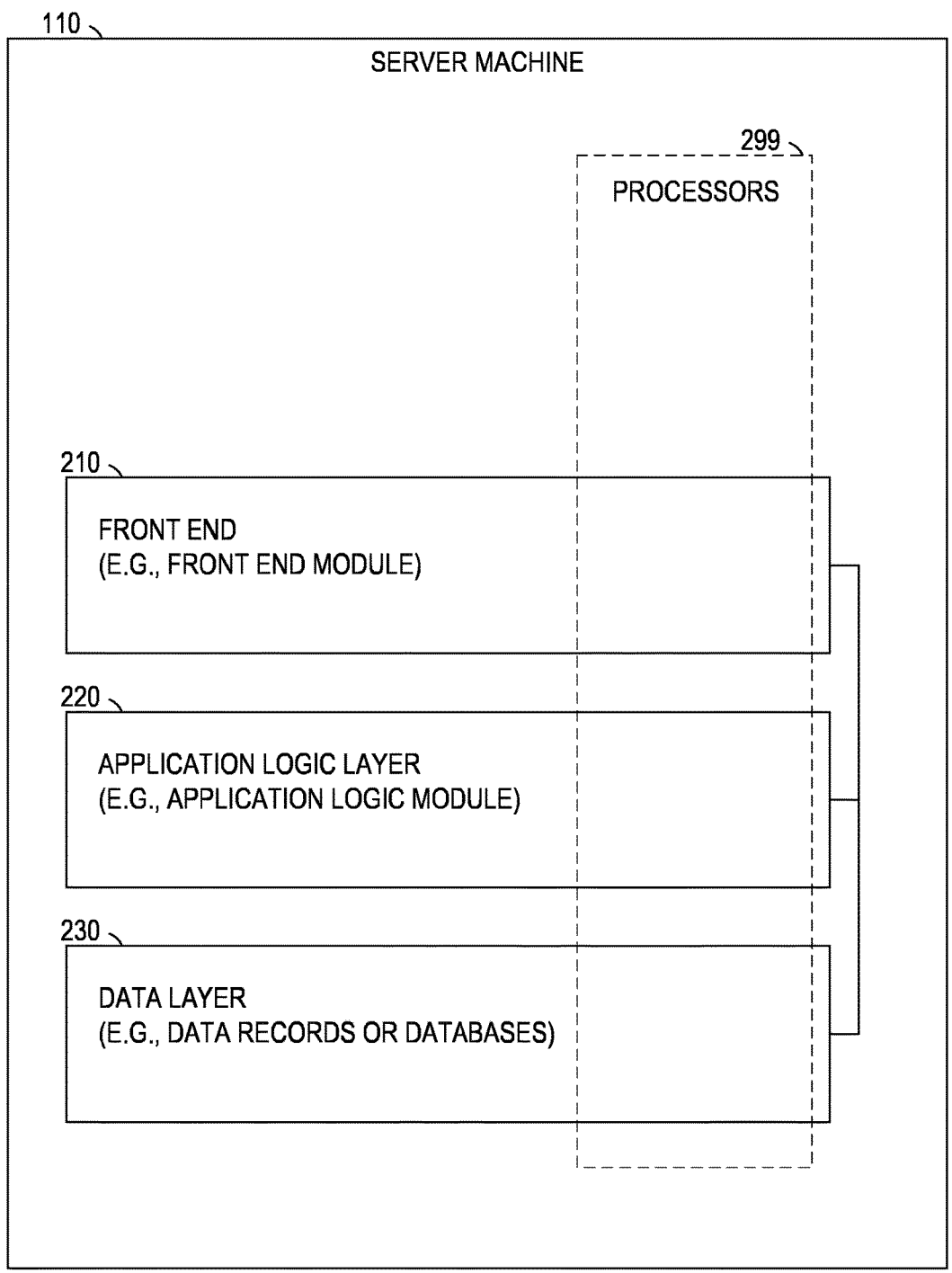
FIG. 2 is a block diagram illustrating components of a server machine suitable for facilitating generation and provision of an voice interface to a social networking service, consistent with some example embodiments.

FIG. 2 is a block diagram illustrating components of the server machine 110, consistent with some example embodiments. The server machine 110 is shown as including a front end 210 (e.g., a front end layer or a front end module), an application logic layer 220 (e.g., an application logic module), and a data layer 230 (e.g., one or more data records or databases), all configured to communicate with each other (e.g., via a bus, shared memory, or a switch).

Any one or more of the modules described herein may be implemented using hardware alone (e.g., one or more processors 299 of a machine) or a combination of hardware and software. For example, any module described herein may physically include an arrangement of one or more processors 299 (e.g., a subset of or among the one or more processors of the machine) configured to perform the operations described herein for that module. As another example, any module described herein may include software, hardware, or both, that configure an arrangement of one or more processors 299 (e.g., among the one or more processors of the machine) to perform the operations described herein for that module. Accordingly, different modules described herein may include and configure different arrangements of such processors 299 or a single arrangement of such processors 299 at different points in time. Moreover, any two or more modules described herein may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
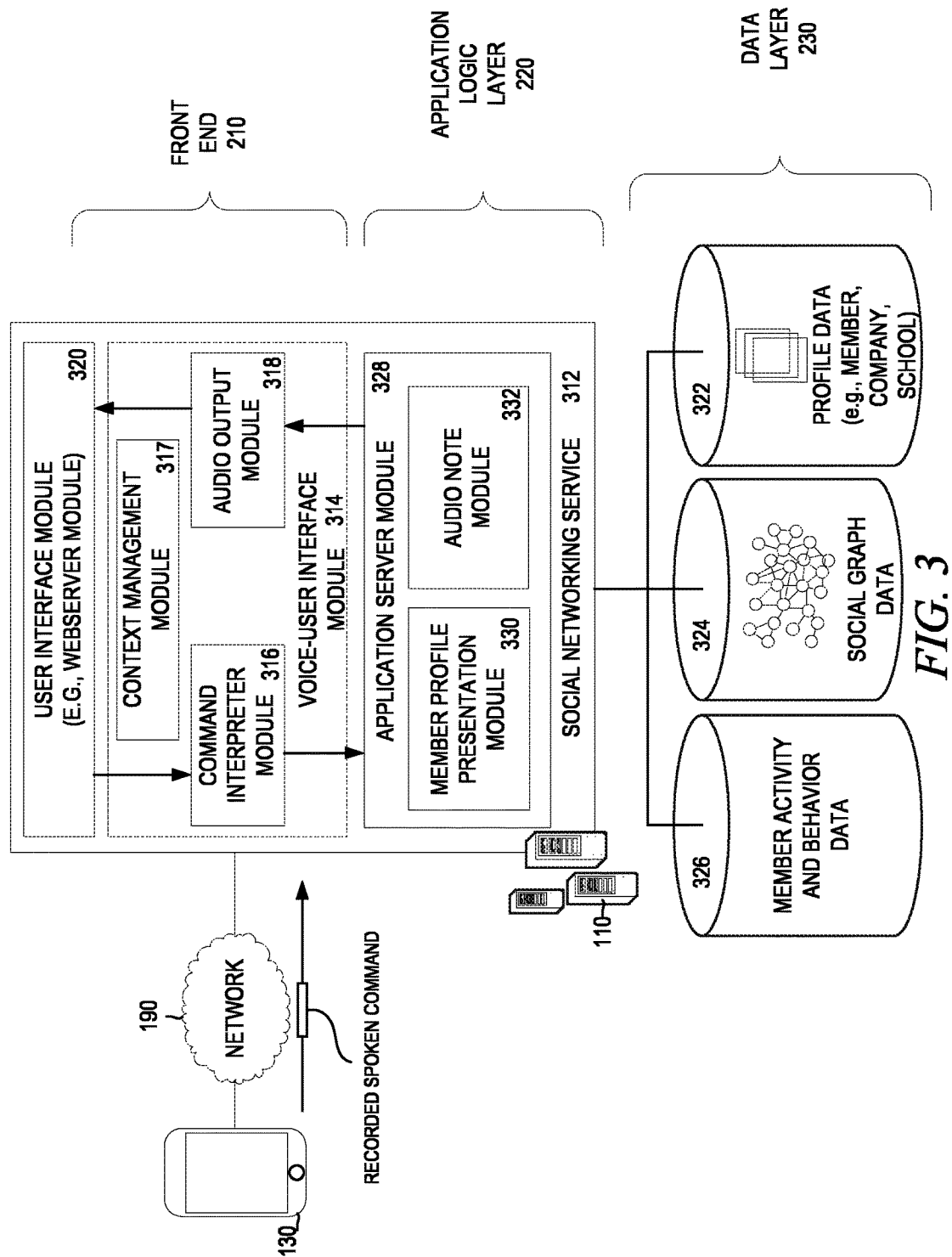
FIG. 3 is a network diagram depicting the server machine providing a social networking service that has a voice-user interface via which one or more users can interact with the social networking service and receive information, consistent with some example embodiments.

FIG. 3 is a network diagram depicting the server machine 110 providing (e.g., hosting) a social networking service 312 that has a voice-user interface via which one or more users (e.g., user 132 or user 152) can interact with the social networking service 312 and receive information, consistent with some example embodiments. As illustrated in FIG. 3, a voice-user interface module 314 of the social networking service 312 includes a command interpreter module 316 configured to receive and interpret one or more spoken commands, and an audio output module 318 configured to receive and process information to be played back (e.g., in an aural format) to a user (e.g., a member of the social networking service 312). In some example embodiments, the command interpreter module 316 receives one or more spoken voice commands over the network 190 from a mobile application residing and executing on the device 130, which may be a mobile computing device (e.g., smart phone or tablet computing device). A spoken voice command may be received and processed as a stream of information or as a pre-Attorney recorded file. In certain example embodiments, the command interpreter module 316 operates in conjunction with a telephony application server (e.g., included as part of the social networking service 312) to receive one or more spoken voice commands via a telephonic interface (e.g., a phone call). Accordingly, in some example embodiments, a member (e.g., user 132) of the social networking service 312 is able to interact with the social networking service 312 by dialing a dedicated phone number from a mobile phone (e.g., device 130) or other telephone (e.g., using a wire line telephone service, such as POTS). Although shown in FIG. 1 as residing at the server machine 110 of the social networking service 312, the command interpreter module 316 may reside and execute at the device 130, according to certain example embodiments. For example, in some example embodiments, the command interpreter module 316 may receive one or more spoken commands at the device 130 and interpret those commands before communicating a data request to the social networking service 312.

As shown in FIG. 3, the social networking service 312 generally may be based on a three-tiered architecture, for example, an architecture that includes the front end 210, the application logic layer 220, and the data layer 230. Each component (e.g., module, engine, database, or other component) shown in FIG. 3 may be or include a set of executable software instructions and corresponding hardware (e.g., memory and processor) for executing the instructions. As noted above, the various functional modules and other components depicted in FIG. 3 may reside on a single server computer, or may be distributed across several server computers in various arrangements. Moreover, although depicted in FIG. 3 as a three-tiered architecture, the architecture of the social networking service 312 is by no means limited to three tiers.

As shown in FIG. 3, the front end 210 may be or include a user interface module 320 (e.g., a webserver module) and a voice-user interface module 314, which may be configured to receive requests from various client computing devices (e.g., devices 130 and 150), and communicate appropriate responses to the requesting client computing devices. For example, the user interface module 320 may be configured to receive one or more requests in the form of Hypertext Transport Protocol (HTTP) requests or other web-based application programming interface (API) requests. The client computing devices may be executing web browser applications or applications that have been developed for a specific platform to include any of a wide variety of mobile computing devices and mobile-specific operating systems. The voice-user interface module 314 may be configured to receive one or more spoken voice commands (e.g., over a data network, a telephone network, or any suitable combination thereof) and to respond with output (e.g., aurally presented, or presented via another channel, such as one or more mobile notifications, emails, windows of a graphical user interface, web pages, or any suitable combination thereof).

As shown in FIG. 3, the data layer 230 includes one or more databases, such as a profile database 322 for storing profile data, which may include profiles of members or other entities (e.g., companies, schools, or other organizations) represented in a social graph maintained by the social networking service 312. Thus, the profile database 322 may store member profiles, company profiles, and educational institution profiles, as well as information concerning various online or offline groups. According to various example embodiments, any number of other entities may be included in the social graph, and various other databases may be used to store data corresponding with other entities. The social graph itself may be stored in a social graph database 324 (e.g., as structured data representing relationships between or among members and other represented entities). Furthermore, data tracking the activity and behavior of one or more members (e.g., users 132 and 152) of the social networking service 312 may be stored in a behavioral database 326. For example, such data may include records of spoken voice commands received by the social networking service 312.

Consistent with some example embodiments, when a user (e.g., user 132) initially registers to become a member of the social networking service 312, the user is prompted to provide some personal information, such as his or her name, age (e.g., birthdate), gender, interests, contact information, home town, address, the names of the member's family members (e.g., spouse), educational background (e.g., schools, majors, matriculation date, or graduation date), employment history, skills, and professional organizations. This information—generally referred to as member profile information—is stored, for example, in the profile database 322. Similarly, when a representative (e.g., user 152) of an organization initially registers the organization with the social networking service 312, the representative may be prompted to provide certain information about the organization. This information—generally referred to as company profile information—may be stored, for example, in the profile database 322.

Once registered, a member (e.g., user 132) may invite other members (e.g., user 152), or be invited by other members, to connect via the social networking service 312. A "connection" may rely upon a bilateral agreement by the connecting members (e.g., users 132 and 152), such that both members acknowledge the establishment of the connection. Alternatively, according to certain example embodiments, a member (e.g., user 132) may elect to "follow" another member (e.g., user 152). In contrast to establishing a connection (e.g., a bilateral connection), the concept of "following" another member typically is a unilateral operation, and at least in some example embodiments, does not require acknowledgement or approval by the member that is being followed (e.g., user 152). When one member follows another member, the member who is following (e.g., user 132) may receive status updates or other messages published by the member being followed (e.g., user 152), or relating to various activities undertaken by the member being followed. Similarly, when a member (e.g., user 132) follows an organization, the member becomes eligible to receive messages or status updates published on behalf of the organization. For instance, messages or status updates published on behalf of an organization that a member is following will appear in the member's personalized activity or content stream. According to some example embodiments, the various associations and relationships that the members establish with other members, or with other entities and objects, are stored and maintained within a social graph, which is shown in FIG. 3 as being stored in the social graph database 324.

As a member (e.g., user 132) interacts with the various applications, services and content made available via the social networking service 312, the member's behavior (e.g., content viewed and links selected) may be monitored, and information concerning the member's behavior may be stored within the behavioral database 326. This information may be used to infer a member's intent, interests, or both, as well as used to classify the member as being in one or more of various categories. For example, if the member (e.g., user 132) performs frequent searches of job listings, thereby exhibiting behavior indicating that the member likely is a job seeker, this information can be used to classify the member as a job seeker. This classification can then be used as a targetable attribute or characteristic for purposes of enabling others (e.g., an advertiser) to target the member for receiving advertisements, messages, or status updates.

As shown in FIG. 3, the application logic layer 220 may include one or more instances of an application server module 328, which in conjunction with the user interface module 320 and the voice-user interface module 314, may be configured to generate one or more user interfaces with (e.g., based on, including, or both) data retrieved from various data sources or data services in the data layer 230. In some example embodiments, the application server module 328 may be configured to implement functionality associated with one or more applications, services, or features of the social networking service 312. For instance, a messaging application (e.g., an email application, an instant messaging application, or any suitable combination thereof) may be implemented in the application server module 328. Similarly, a photo-sharing application may be implemented within the application server module 328. Likewise, a search engine enabling users to search for and browse member profiles may be implemented in the application server module 328. According to various example embodiments, one or more other applications and services may be embodied in the application server module 328, in a separate instance of the application server module 328, or separately embodied in their own modules.

The voice-user interface module 314 may be configured to operate with one or more instances of the application server module 328. As shown in FIG. 3, the application server module 328 may be or include a member profile presentation module 330, an audio note module 332, or both. The member profile presentation module 330 may be configured to operate in conjunction with the voice-user interface module 314 to identify and then present member profile information to a requesting member (e.g., user 132) in response to a received spoken voice command. For example, when a spoken command, such as "Give me a summary of Bob Smith's member profile," is received and interpreted, the command may be translated to a data request directed to the member profile presentation module 330. The member profile presentation module 330 may then access one or more underlying data services (e.g., provided by the profile database 322, the social graph database 324, the behavioral database 326, or any suitable combination thereof) to identify and retrieve the relevant information, and then communicate the information to an audio output module 318 for presentation to the requesting member (e.g., user 132). The audio output module 318 may for example, process the data received from the member profile presentation module 330 to generate an aural output that is played to the requesting member.

The audio note module 332 may be configured to operate in conjunction with the voice-user interface module 314 and enable one or more members (e.g., user 132) to record and retrieve (e.g., play back) one or more audio notes (e.g., spoken annotations regarding one or more other members of the social networking service 312). For example, using a mobile application residing and executing at the device 130, a member (e.g., user 132) may invoke an audio note application or audio note service executing at the social networking service 312 and then record an audio note (e.g., a spoken annotation) that can then be associated with a particular member profile (e.g., a member profile that corresponds to the user 152). The resulting audio note may be associated with the member profile in such a way that the audio note is only accessible to the member who recorded the audio note (e.g., user 132). At some subsequent time, the member (e.g., user 132) can use the voice-user interface module 314 to retrieve (e.g., access) and play back the previously recorded audio note. According to various example embodiments, the audio note may be accessible via one or more other user interfaces as well (e.g., via a link on a web page).

As another example, the member (e.g., user 132) may record an audio note (e.g., regarding himself or herself, or regarding another entity) and associate the audio note with his or her own member profile so that other members (e.g., user 152) of the social networking service 312 can play back the audio note. In some example embodiments, the member who records the audio note (e.g., user 132) and associates the audio note with his or her member profile may also tag the audio note, or select a particular type (e.g., category) for the note. For example, the audio note may be or relate to an elevator pitch, a job opening, a member profile summary, a company profile summary, a joke, a song, a status update, or any other number of audio note types. The member who records the audio note (e.g., user 132) can set access permissions for the recorded audio note so that only certain members (e.g., user 152) can access the audio note. For example, the access permissions may be set so that all members of the social networking service 312 have access, only first-degree connections (e.g., of the user 132) have access, only first-degree and second-degree connections (e.g., of the user 132) have access, only followers of the member (e.g., user 132) have access, all members employed by a certain company or certain set of companies have access, or any suitable combination thereof.

In some example embodiments, a mobile application (e.g., as described below with respect to FIG. 4) may generate a notification under certain circumstances to indicate the availability of another member's audio note (e.g., an audio note recorded by the user 132). For instance, using location information from mobile computing devices (e.g., devices 130 and 150), a notification may be generated and presented when one member (e.g., user 152) is determined to be near (e.g., proximate in geographical location) another member (e.g., user 132) who has a recorded audio note associated with his or her member profile. In another scenario, when two members (e.g., users 132 and 152) are scheduled to be meeting with one another (e.g., as determined based on analyzing calendar event data from an integrated calendar application), a notification may be generated and presented to one or both members to indicate that a member (e.g., user 132) has an accessible recorded audio note associated with his or her member profile.

As shown in FIG. 3, the voice-user interface module 314 includes a context management module 317, which may be configured to maintain and provide contextual information for use in interpreting one or more received spoken commands. For example, when several commands are received in succession, one or more of the earlier received commands may provide full or partial meaning for a later received command. Accordingly, the context management module 317 may be configured to maintain information about such received commands for use in interpreting future commands. In addition, depending upon the particular type of spoken command received, one or more additional data sources (e.g., the profile database 322, the social graph database 324, and the behavioral database 326) may be accessed to obtain information for use in interpreting and processing a particular command.

Figure 4:
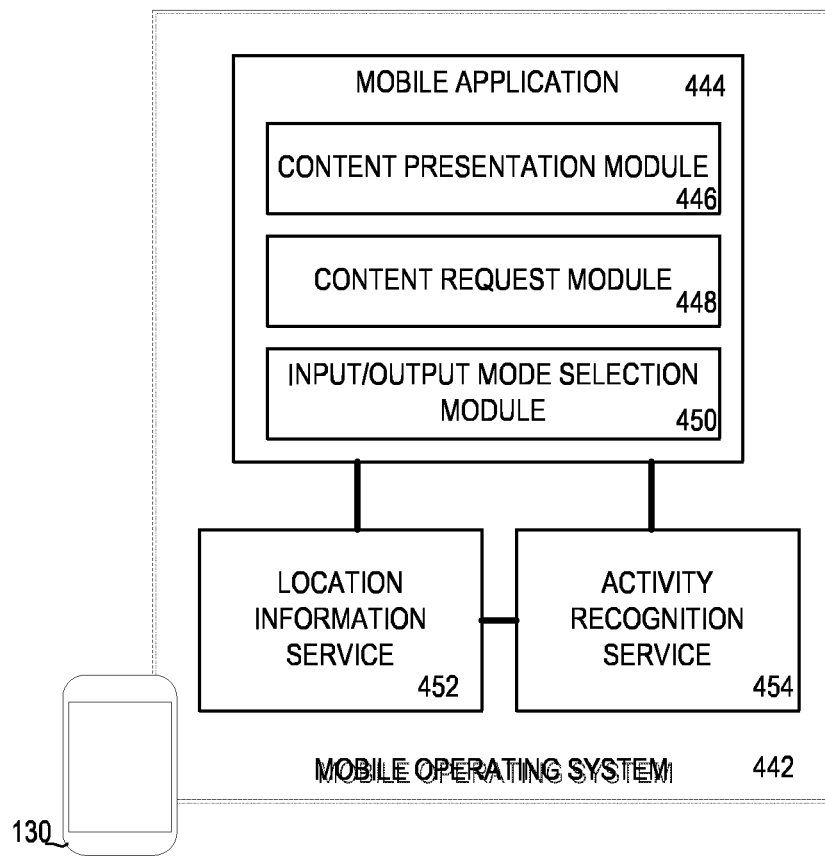
FIG. 4 is a functional block diagram depicting some functional components of a device suitable for facilitating generation and provision of an voice interface to a social networking service, consistent with some example embodiments.

FIG. 4 is a functional block diagram depicting some of the functional components (e.g., modules) of the device 130, which may be a mobile computing device, consistent with some example embodiments. As illustrated in FIG. 4, the device 130 has a mobile operating system 442 (e.g., iOS®, Andriod®, or similar operating system). As shown in FIG. 4, a mobile application 444 is residing and executing on the device 130 (e.g., executing on or with the mobile operating system 442 of the device 130). Using the mobile application 444 and a touch interface of a touch screen display of the device 130, a member of the social networking service 312 (e.g., the user 132 of the device 130) can interact with the mobile application 444 to request and receive information from the social networking service 312, including member profile information of one or more other members (e.g., user 152) of the social networking service 312. The mobile application 444 has a content presentation module 446, which may be configured to present content on the device 130 (e.g., present images, text, and video via a display screen, present speech, sounds, and music via a speaker, or any suitable combination thereof). The mobile application 444 may also have a content request module 448, which may be configured to request such content from the social networking service 312 (e.g., via the server machine 110, the database 115, the network 190, or any suitable combination thereof). The manner in which content is presented via the content presentation module 446 may depend, at least in part, on a selected operating mode of the mobile application 444. For example, in a normal operating mode, the user 132 might use a touch screen display of the device 130 to interact with the mobile application 444. However, using an input/output mode selection module 450, the user 132 of the mobile application 444 may select to use a voice-operating mode for interacting with the mobile application 444, which may have the effect of selecting the voice-operating mode for interacting with the social networking service 312. Accordingly, in some embodiments, the user 132 invokes the voice-operating mode explicitly (e.g., manually) in order to use an voice interface (e.g., a voice-user interface) for interacting with the social networking service 312.

In some example embodiments, the mobile application 444 is configured or may be configurable to automatically enter the voice-operating mode under certain conditions. For example, as illustrated in FIG. 4, the mobile operating system 442 of the device 130 includes a location information service 452, an activity recognition service 454, or both. The mobile application 444 may be configured to register a request with the location information service 452 to periodically receive location information, for example, indicating the current geographical coordinates of the device 130, the current speed of the device 130, the current direction of travel of the device 130, or any suitable combination thereof Similarly, the mobile application 444 may be configured to register a request with the activity recognition service 454 to periodically receive information identifying one or more inferred activity states of the user 132 of the device 130, for example, based on one or more signals received from various sensors (e.g., accelerometer, gyroscope, compass, one or more network interfaces, one or more input components described below with respect to FIG. 7, or any suitable combination thereof). Accordingly, the user 132 of the mobile application 444 may configure the mobile application 444 to automatically enter into the voice-operating mode under certain circumstances. Examples of such circumstances include situations in which information obtained from the location information service 452, from the activity recognition service 454, or from both, indicates or suggests that the user 132 is operating the device 130 in a moving vehicle (e.g., an automobile or an airplane). Similarly, the user 132 may configure the mobile application 444 to automatically enter the voice-operating mode when the device 130 is in certain locations (e.g., within a threshold distance of one or more geographical locations), as determined by location information obtained from the location information service 452. Likewise, the user 132 may configure the mobile application 444 to automatically enter the voice-operating mode when the user 132 is inferred to be in one of several physical activity states (e.g., walking, or running), as indicated by an inferred activity status generated by the activity recognition service 454.

Figure 5:
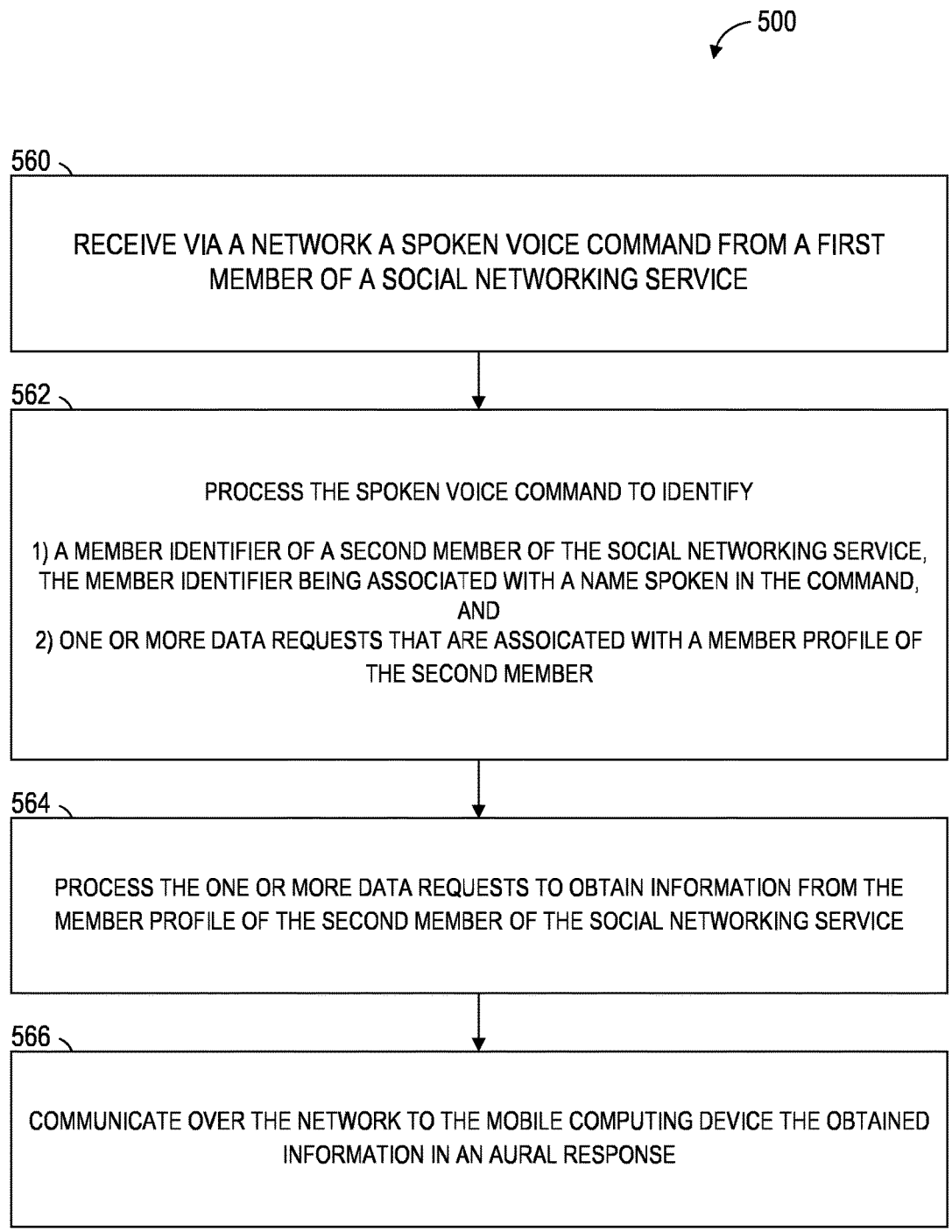
FIG. 5 is a flowchart illustrating operations of a method performed by a server machine when processing a received spoken command, consistent with some example embodiments.

FIG. 5 is a flowchart illustrating operations of a method 500 performed by the server machine 110 (e.g., as part of providing the social networking service 312) when processing a received spoken command, consistent with some example embodiments. At method operation 560, a spoken voice command (e.g., spoken by the user 132) is received at the server machine 110 (e.g., by the user interface module 320), which may be providing, operating, or otherwise associated with the social networking service 312. The spoken voice command may be received via (e.g., over) the network 190, and may be recorded (e.g., in an audio file format) and transmitted as an audio file or may be streamed directly (e.g., without recording at the device 130).

At method operation 562, the spoken voice command is processed and analyzed (e.g., by the command interpreter module 316) using natural language processing techniques. In particular, using natural language processing techniques, the spoken command may be parsed to identify any names (e.g., of members of the social networking service 312) mentioned, spoken, or otherwise referenced in the received voice command. The parsed spoken command may then be matched (e.g., by the command interpreter module 316) with one or more data requests (e.g., data requests that are available for use). For example, if the spoken command is or includes the phrase "Give me a profile summary of Bob Smith . . . ," the natural language processing may identify the name "Bob Smith" within the phrase and assign (e.g., map) the words "profile summary" from the phrase to one or more particular data requests that correspond with particular information that defines, indicates, or otherwise specifies what is a profile summary (e.g., what is in a profile summary).

In some instances, multiple (e.g., many) members of the social networking service 312 share the particular name that is identified in the spoken command (e.g., "Bob Smith"). Accordingly, in some example embodiments, a disambiguation process is performed (e.g., by the context management module 317) to disambiguate the common name and identify the particular member (e.g., determine an identifier of the particular member) that uniquely identifies (e.g., among all other members the social networking service 312) the particular member that has the common name. In order to disambiguate the common name, a variety of information may be analyzed. For example, the social graph of the particular member who is requesting the information (e.g., user 132) may be analyzed to identify the network distance (e.g., social network distance, as measured by hops or connections between or among members) from the particular member to each of members of the social networking service 312 who have the common name. If, for example, there is one "Bob Smith" with whom the requesting member (e.g., user 132) is directly connected, there is a high likelihood that this is the member being referenced in the received spoken command. In addition to various measures of network distance, disambiguation may be based on the concept of homophily, the tendency of individuals to associate with others who are similar. Thus, in some example embodiments, a similarity score may be derived (e.g., generated, calculated, or determined) by analyzing one or more of various member profile attributes (e.g., descriptors) of the requesting member (e.g., user 132) and of each member having the common name identified within the spoken command. Some attributes may be weighted more heavily in the derivation of the similarity score. Examples of such attributes may include geographic location, company of employment (e.g., employer), membership in common groups (e.g., online groups), or any suitable combination thereof. Using the similarity scores for each member sharing the spoken name, the disambiguation process attempts to identify a single best candidate with the highest likelihood of being the one member (e.g., user 152) referenced in the spoken command.

In some example embodiments, when the disambiguation process results in two or more members having similar scores such that there is not one clearly identified member who is being referenced in the spoken command, the context management module 317 may prompt the requesting member to select one of the several identified members by some particular unique member profile attribute. For example, if there are three members with the name "Bob Smith," the context management module 317 may prompt the requesting member (e.g., user 132) to indicate or suggest whether a particular member is the correct member. This prompting may be performed by asking a question that includes some member profile that is unique to one of the three members (e.g., unique among the three members). For example, the requesting member (e.g., user 132) may be prompted with "Are you referring to the Bob Smith who resides in the San Francisco Bay Area?" or "Are you referring to the Bob Smith who is employed as a software engineer at IBM?" Then, by speaking an affirmative or negative answer (e.g., a yes or a no), the requesting member can assist in disambiguating the spoken name and identifying the correct member (e.g., user 152) being referenced in the spoken voice command.

At method operation 564, the one or more data requests that are associated with (e.g., corresponding to) the spoken command are processed (e.g., by the application server module 328 or a sub-module thereof) to obtain the particular information that is being requested for the identified member. For example, if the spoken command relates to a member profile summary, one or more portions of the referenced member's profile may be obtained with one or more corresponding data requests. Similarly, if the spoken command relates to a request for a particular member profile attribute (e.g., all connections shared in common between the requesting member and the referenced member "Bob Smith"), then that particular information is retrieved.

At method operation 566, the obtained information is provided to the requesting member (e.g., user 132, via the device 130). Specifically, the obtained information is prepared (e.g., formatted) for inclusion in a response that may be played back (e.g., spoken back) to the requesting member. In addition, in certain example embodiments, the response may be provided via two or more communication channels. For instance, in addition to playing back (e.g., speaking back) the requested information in an aural response (e.g., via a speaker of the device 130), some or all of the requested information may be communicated to the device 130 from which the request was received so that some or all of the information can be presented visually via a graphical user interface on the display of the device 130.

Figure 6:
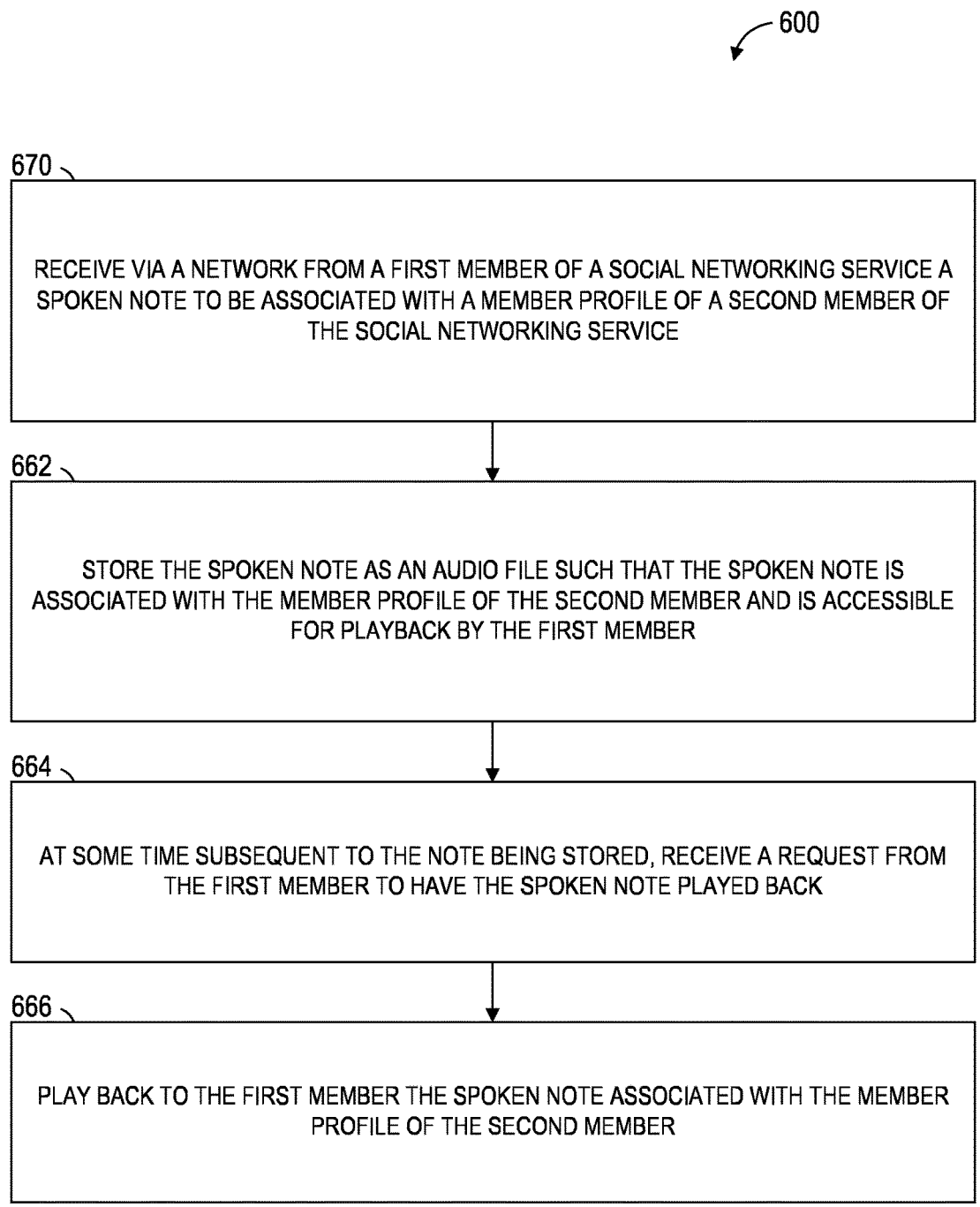
FIG. 6 is a flowchart illustrating operations in a method performed by the server machine when receiving a spoken note from a first member for use in annotating a member profile of a second member of the social networking service, consistent with some embodiments

FIG. 6 is a flowchart illustrating operations in a method 600 performed by the server machine 110 (e.g., as part of providing the social networking service 312) when receiving a spoken note (e.g., an audio annotation) from a first member (e.g., user 132) for use in annotating a member profile of a second member (e.g., user 152) of the social networking service 312, consistent with some embodiments. At method operation 670, the first member (e.g., user 132) of the social networking service 312 uses the mobile application 444 residing and executing on the device 130 to generate a spoken note that is to be associated with the second member (e.g., user 152) of the social networking service 312. For example, the mobile application 444 may provide a button or other user interface element that invokes a notes application that enables the member to record the spoken note. The button may, for example, be presented in connection with the member profile of the member with whom the spoken note is to be associated (e.g., user 152).

At method operation 662, the spoken note is received (e.g., by the audio note module 332) and stored (e.g., in the database 115, in the audio note module 332, or both). The spoken note may be stored in any of a wide variety of audio file formats. The spoken note may be stored in such a way (e.g., with suitable access permissions) that it will be accessible to the member who recorded the note (e.g., user 132), but generally not by other members (e.g., user 152). In some example embodiments, the audio note module 332 includes a speech-recognition feature (e.g., as a sub-module or other component), and the spoken note may be stored with a text version of the spoken note (e.g., as recognized by the speech recognition feature).

At method operation 664, which may be performed at some time subsequent to the spoken note being stored, the member (e.g., user 132) can use a graphical user interface, a voice-user interface, or both, to request that the spoken note be played back to the member (e.g., user 132). For example, using a voice-user interface, the member may speak a command or request, such as "Do I have any audio notes for Bob Smith?" In response, at method operation 666, the spoken audio note is played back to the member (e.g., user 132) who recorded the audio notes about Bob Smith (e.g., user 152). Specifically, the recorded audio note may be communicated to the device 130 from which the member (e.g., user 132) initiated the command or request for playback.

In another example scenario, the first member (e.g., user 132) may record a spoken note for other members (e.g., user 152) to access. For example, as part of creating his or her own member profile, the first member may record a spoken note, such as an elevator pitch, and then make that spoken note accessible to other members (e.g., all other members of the social networking service 312 or one or more subsets thereof). For example, the spoken note may be made accessible globally (e.g., to all members of the social networking service 312) or accessible only to some subset of members as specified by the first member (e.g., user 132). When the spoken note is present and accessible, one or more of such other members (e.g., user 152) may access the spoken note of the first member (e.g., user 132) using the voice-user interface.

While many of the examples provided herein are specific to a voice-user interface for use in querying one or more member profiles of the social networking service 312, the methodologies described herein may similarly be applied to a wide variety of other applications (e.g., applications that leverage one or more social networking services). For example, some social networking services (e.g., with a career or professional focus) may support and provide company profiles (e.g., company profile pages) and school profiles (e.g., school profile pages) in addition to member profiles (e.g., member profile pages). Accordingly, using spoken commands similar to those described above, a user (e.g., user 132) may query the social networking service 312 for information relating to a company or a school that has a presence in the social graph of the social networking service 312. Another feature that may be supported or provided by the social networking service 312 and with which the voice-user interface may be integrated is a contact management application in which one or more users (e.g., user 132) may query their contacts database by speaking one or more short, natural language commands. In yet another example, a calendar application may be queried using the voice-user interface. Provided immediately below is a short list of example spoken questions, requests, or commands for various applications that may support (e.g., respond to) the voice-user interface discussed herein, consistent with various example embodiments:

"How many employees does ACME Products have?"
"What was ACME Product's net income for the last quarter?"
"What academic courses does the Economics department at State University offer?"
"Where does Bob Smith live?"
"What is Bob Smith's phone number?"
"When is my next meeting?"
"Who has been invited to my next meeting?"
"When is my next meeting at ACME Products?"

According to various example embodiments, one or more of the methodologies described herein may facilitate generation and provision of an voice interface to a social networking service. Moreover, one or more of the methodologies described herein may facilitate voice-activated commands, requests, or other initiation of interactions with the social networking service. Hence, one or more of the methodologies described herein may facilitate making voice-initiated submissions to the social networking service, as well as obtaining orally or visually presented results of such voice-initiated submissions.

When these effects are considered in aggregate, one or more of the methodologies described herein may obviate a need for certain efforts or resources that otherwise would be involved in generating and providing an voice interface to social networking service. Efforts expended by a user in interfacing with the social networking service may be reduced by use of (e.g., reliance upon) a machine that implements one or more of the methodologies described herein. Computing resources used by one or more machines, databases, or devices (e.g., within the network environment 100) may similarly be reduced (e.g., compared to machines, databases, or devices that lack one or more the methodologies described herein). Examples of such computing resources include processor cycles, network traffic, memory usage, data storage capacity, power consumption, and cooling capacity.

Figure 7:
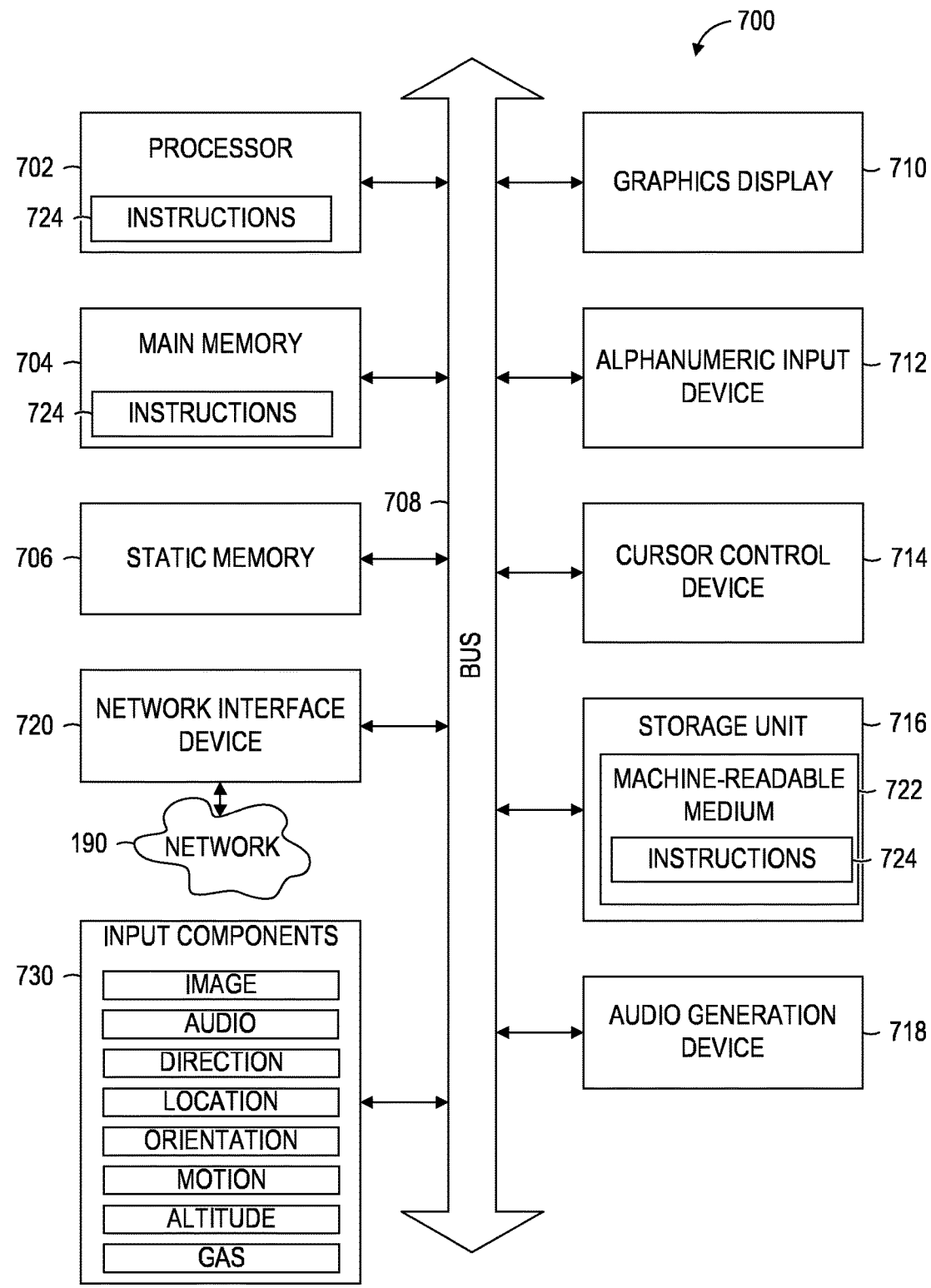

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer system (e.g., a computer) within which the instructions 724 (e.g., software, a program, an application, an applet, an app, or other executable code) for causing the machine 700 to perform any one or more of the methodologies discussed herein may be executed, in whole or in part.

In alternative embodiments, the machine 700 operates as a standalone device or may be communicatively coupled (e.g., networked) to other machines. In a networked deployment, the machine 700 may operate in the capacity of a server machine or a client machine in a server-client network environment, or as a peer machine in a distributed (e.g., peer-to-peer) network environment. The machine 700 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 724, sequentially or otherwise, that specify actions to be taken by that machine. Further, while only a single machine is illustrated, the term "machine" shall also be taken to include any collection of machines that individually or jointly execute the instructions 724 to perform all or part of any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain solid-state digital microcircuits (e.g., electronic, optical, or both) that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein. In some example embodiments, the processor 702 is a multicore CPU (e.g., a dual-core CPU, a quad-core CPU, or a 128-core CPU) within which each of multiple cores is a separate processor that is able to perform any one or more the methodologies discussed herein, in whole or in part. Although the beneficial effects described herein may be provided by the machine 700 with at least the processor 702, these same effects may be provided by a different kind of machine that contains no processors (e.g., a purely mechanical system, a purely hydraulic system, or a hybrid mechanical-hydraulic system), if such a processor-less machine is configured to perform one or more the methodologies described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, an audio generation device 718 (e.g., a sound card, an amplifier, a speaker, a headphone jack, or any suitable combination thereof), and a network interface device 720.

The storage unit 716 includes the machine-readable medium 722 (e.g., a tangible and non-transitory machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media (e.g., tangible and non-transitory machine-readable media). The instructions 724 may be transmitted or received over the network 190 via the network interface device 720. For example, the network interface device 720 may communicate the instructions 724 using any one or more transfer protocols (e.g., HTTP).

In some example embodiments, the machine 700 may be a portable computing device, such as a smart phone or tablet computer, and have one or more additional input components 730 (e.g., sensors or gauges). Examples of such input components 730 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 722 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 724 for execution by the machine 700, such that the instructions 724, when executed by one or more processors of the machine 700 (e.g., processor 702), cause the machine 700 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof. In some example embodiments, the instructions 724 for execution by the machine 700 may be carried by a carrier medium. Examples of such a carrier medium include a storage medium and a transient medium (e.g., a signal carrying the instructions 724).

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a CPU or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a CPU configured by software to become a special-purpose processor, the CPU may be configured as respectively different special-purpose processors (e.g., each included in a different hardware module) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. Accordingly, the operations described herein may be at least partially processor-implemented, since a processor is an example of hardware. For example, at least some operations of any method may be performed by one or more processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The performance of certain operations may be distributed among the one or more processors, whether residing only within a single machine or deployed across a number of machines. In some example embodiments, the one or more processors or hardware modules (e.g., processor-implemented modules) may be located in a single geographic location (e.g., within a home environment, an office environment, or a server farm). In other example embodiments, the one or more processors or hardware modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following enumerated embodiments describe various example embodiments of methods, machine-readable media, and systems (e.g., apparatus) discussed herein.

A first embodiment provides a method comprising:
receiving a spoken request submitted by a first member of a social networking service, the spoken request being received via a network from a device of the first member and referencing a subject entity about whom information is sought by the first member;
identifying a second member of the social networking service as the subject entity referenced by the spoken request, the second member being described by descriptors stored in a member profile maintained by the social networking service, the identifying of the second member being performed by a command interpreter module comprising one or more processors of a machine;
automatically selecting a subset of the descriptors from the member profile of the second member, the automatic selecting of the subset of the descriptors being based on the spoken request; and
causing the device of the first member to present the automatically selected subset of the descriptors from the member profile of the second member in response to the spoken request submitted by the first member.

A second embodiment provides a method according to the first embodiment, wherein:
the causing of the device to present the automatically selected subset of the descriptors includes:
providing the device with a speech version of at least one descriptor among the automatically selected subset of the descriptors from the member profile of the second member; and
causing the device to play the speech version of the at least one descriptor.

A third embodiment provides a method according to the first embodiment or the second embodiment, wherein:
the causing of the device to present the automatically selected subset of the descriptors includes:
providing the device with a visual version of at least one descriptor among the automatically selected subset of the descriptors from the member profile of the second member; and
causing the device to display the visual version of the at least one descriptor.

A fourth embodiment provides a method according to any of the first through third embodiments, wherein:
the identifying of the second member as the subject entity referenced by the spoken request includes:
identifying a name of a person in the spoken request; and
disambiguating the name of the person based on social graph information that indicates relationships between members of the social networking service, the disambiguated name of the person corresponding to the second member.

A fifth embodiment provides a method according to any of the first through fourth embodiments, wherein:
the identifying of the second member as the subject entity referenced by the spoken request includes:
identifying a name of a person in the spoken request; and
determining that the name of the person matches an identifier of the second member within event data that represents an event scheduled in a calendar application of the first member.

A sixth embodiment provides a method according to any of the first through fifth embodiments, wherein:
the identifying of the second member as the subject entity referenced by the spoken request includes:
identifying an email address of a person in the spoken request; and
determining that the email address of the person matches an identifier of the second member within event data that represents an event scheduled in a calendar application of the first member.

A seventh embodiment provides a method according to any of the first through sixth embodiments, wherein:
the identifying of the second member as the subject entity referenced by the spoken request includes:
identifying, within the spoken request, a name of a group of members of the social networking service; and
determining that the second member is included in the group of members of the social networking service.

An eighth embodiment provides a method according to any of the first through seventh embodiments, further comprising:
receiving a submission that includes an audio annotation spoken by the first member and indicated as a descriptor of the second member;
storing the audio annotation as the descriptor of the second member; and
providing the stored audio annotation to the device of the first member in response to a request by the first member for playback of audio information regarding the second member.

A ninth embodiment provides a method according to the eighth embodiment, wherein:
the device of the first member is a first device;
the received submission includes an indication that the audio annotation is accessible by the first member but not the second member;
the providing of the stored audio annotation to the device of the first member is based on the indication that the audio annotation is accessible by the first member; and the method further comprises
preventing access to the stored audio annotation by a second device of the second member based on the indication that the audio annotation is not accessible to the second member.

A tenth embodiment provides a method according to any of the first through ninth embodiments, wherein:
the device of the first member is a first device; and the method further comprises receiving a submission that includes an audio annotation spoken by the first member and indicated as a descriptor of the first member;
storing the audio annotation as the descriptor of the first member; and
providing the stored audio annotation to a second device of the second member in response to a request by the second member for playback of audio information regarding the first member that spoke the audio annotation.

An eleventh embodiment provides a method according to the tenth embodiment, wherein:

the received submission includes an indication that the audio annotation is accessible by the second member; and the providing of the stored audio annotation to the second device of the second member is based on the indication that the audio annotation is accessible by the second member.

A twelfth embodiment provides a method according to the eleventh embodiment, wherein:

the indication in the received submission indicates that the audio annotation is not accessible by a third member of the social networking service; and the method further comprises preventing access to the stored audio annotation by a third device of the third member of the social networking service based on the received submission indicating that the audio annotation is not accessible by the third member.

The thirteenth embodiment provides a method according to any of the first through twelfth embodiments, wherein:

the spoken request includes a data request for a summary of the member profile of the second member of the social networking service;

the automatic selecting of the subset of the descriptors that describe the second member includes automatically generating the summary of the member profile of the second member; and the causing of the device to present the automatically selected subset of the descriptors includes:

providing the automatically generated summary to the device; and causing the device to present the automatically generated summary.

A fourteenth embodiment provides a method according to any of the first through thirteenth embodiments, wherein:

the spoken request includes a data request for information specifying a most recent previous communication between the first member and the second member; and the method further comprises:

accessing a behavioral database that stores a record of the most recent previous communication between the first member and the second member; and causing the device to present at least part of the record of the most recent previous communication between the first member and the second member.

A fifteenth embodiment provides a method according to any of the first through fourteenth embodiments, wherein:

the spoken request includes a data request for information specifying a quantity of third members of the social networking service who are directly connected to both the first member and the second member within the social networking service; and the method further comprises:

accessing a social graph database that stores a social graph specifying relationships among at least the third members of the social networking service; and causing the device to present the quantity of third members who are directly connected to both the first member and the second member within the social networking service.

A sixteenth embodiment provides a non-transitory machine-readable storage medium comprising instructions that, when executed by one or more processors of a machine, cause the machine to perform operations comprising:

receiving a spoken request submitted by a first member of a social networking service, the spoken request being received via a network from a device of the first member and referencing a subject entity about whom information is sought by the first member;

identifying a second member of the social networking service as the subject entity referenced by the spoken request, the second member being described by descriptors stored in a member profile maintained by the social networking service, the identifying of the second member being performed by a command interpreter module comprising one or more processors of the machine;

automatically selecting a subset of the descriptors from the member profile of the second member, the automatic selecting of the subset of the descriptors being based on the spoken request; and causing the device of the first member to present the automatically selected subset of the descriptors from the member profile of the second member in response to the spoken request submitted by the first member.

A seventeenth embodiment provides a non-transitory machine-readable storage medium according to the sixteenth embodiment, wherein:

the causing of the device to present the automatically selected subset of the descriptors includes:

providing the device with a speech version of at least one descriptor among the automatically selected subset of the descriptors from the member profile the second member; and causing the device to play the speech version of the at least one descriptor.

An eighteenth embodiment provides a non-transitory machine-readable storage medium according to the sixteenth embodiment or the seventeenth embodiment, wherein:

the identifying of the second member as the subject entity referenced by the spoken request includes:

identifying a name of a person in the spoken request; and disambiguating the name of the person based on social graph information that indicates relationships between members of the social networking service, the disambiguated name of the person corresponding to the second member.

A nineteenth embodiment provides a system comprising:

processors;

a user interface module comprising one or more of the processors and configured to receive a spoken request submitted by a first member of a social networking service, the spoken request being received via a network from a device of the first member and referencing a subject entity about whom information is sought by the first member;

a command interpreter module comprising one or more of the processors and configured to identify a second member of the social networking service as the subject entity referenced by the spoken request, the second member being described by descriptors stored in a member profile maintained by the social networking service, the identifying of the second member being performed by a voice-user interface module comprising one or more processors of the machine;

a member profile presentation module comprising one or more of the processors and configured to automatically select a subset of the descriptors from the member profile of the second member, the automatic selecting of the subset of the descriptors being based on the spoken request; and the user interface module comprising one or more of the processors being further configured to cause the device of the first member to present the automatically selected subset of the descriptors from the member profile of the second member in response to the spoken request submitted by the first member.

A twentieth embodiment provides a system according to the nineteenth embodiment, further comprising:

a context management module comprising one or more of the processors and configured to:

identify a name of a person in the spoken request; and disambiguate the name of the person based on social graph information that indicates relationships between members of the social networking service, the disambiguated name of the person corresponding to the second member.

A twenty first embodiment provides a carrier medium carrying machine-readable instructions for controlling a machine to carry out the method of any one of the previously described embodiments.

What is claimed is:

1. A method comprising:

receiving a spoken request submitted by a first member of a social networking service, the spoken request being received via a network from a device of the first member and referencing a subject entity about whom information is sought by the first member;

determining a context for the spoken request based on a set of requests received previous to the spoken request;

identifying a plurality of members of the social networking service based on the spoken request and the context;

causing the device of the first member to present a representative descriptor for one or more members of the plurality of members, the representative descriptors for the one or more members being presented as a query responsive to the spoken request;

receiving a spoken response submitted by the first member, the spoken response indicating a selected representative descriptor;

based in part on the context and the selected representative descriptor, identifying a second member of the social networking service as the subject entity referenced by the spoken request, the second member being described by descriptors stored in a member profile maintained by the social networking service, the identifying of the second member being performed by a command interpreter module comprising one or more processors of a machine;

automatically selecting a subset of the descriptors from the member profile of the second member, the automatic selecting of the subset of the descriptors being based on the spoken request; and causing the device of the first member to present the automatically selected subset of the descriptors from the member profile of the second member in response to the spoken request submitted by the first member;

wherein the identifying of the second member as the subject entity referenced by the spoken request includes:

identifying an email address of a person in the spoken request; and determining that the email address of the person matches an identifier of the second member within event data that represents an event scheduled in a calendar application of the first member.

2. The method of claim 1, wherein:

the causing of the device to present the automatically selected subset of the descriptors includes:

providing the device with a speech version of at least one descriptor among the automatically selected subset of the descriptors from the member profile of the second member; and causing the device to play the speech version of the at least one descriptor.

3. The method of claim 1, wherein:

the causing of the device to present the automatically selected subset of the descriptors includes:

providing the device with a visual version of at least one descriptor among the automatically selected subset of the descriptors from the member profile of the second member; and causing the device to display the visual version of the at least one descriptor.

4. The method of claim 1, wherein:

the identifying of the second member as the subject entity referenced by the spoken request includes:

identifying a name of a person in the spoken request; and disambiguating the name of the person based on social graph information that indicates relationships between members of the social networking service, the disambiguated name of the person corresponding to the second member.

5. The method of claim 1, wherein:

the identifying of the second member as the subject entity referenced by the spoken request includes:

identifying a name of a person in the spoken request; and determining that the name of the person matches an identifier of the second member within event data that represents an event scheduled in a calendar application of the first member.

6. The method of claim 1, wherein:

the identifying of the second member as the subject entity referenced by the spoken request includes:

identifying, within the spoken request, a name of a group of members of the social networking service; and determining that the second member is included in the group of members of the social networking service.

7. The method of claim 1, further comprising:

receiving a submission that includes an audio annotation spoken by the first member and indicated as a descriptor of the second member;

storing the audio annotation as the descriptor of the second member; and providing the stored audio annotation to the device of the first member in response to a request by the first member for playback of audio information regarding the second member.

8. The method of claim 7, wherein:

the device of the first member is a first device;

the received submission includes an indication that the audio annotation is accessible by the first member but not the second member;

the providing of the stored audio annotation to the device of the first member is based on the indication that the audio annotation is accessible by the first member; and the method further comprises preventing access to the stored audio annotation by a second device of the second member based on the indication that the audio annotation is not accessible to the second member.

9. The method of claim 1, wherein:
the device of the first member is a first device; and
the method further comprises receiving a submission that includes an audio annotation spoken by the first member and indicated as a descriptor of the first member;
storing the audio annotation as the descriptor of the first member; and
providing the stored audio annotation to a second device of the second member in response to a request by the second member for playback of audio information regarding the first member that spoke the audio annotation.

10. The method of claim 9, wherein:
the received submission includes an indication that the audio annotation is accessible by the second member; and
the providing of the stored audio annotation to the second device of the second member is based on the indication that the audio annotation is accessible by the second member.

11. The method of claim 10, wherein:
the indication in the received submission indicates that the audio annotation is not accessible by a third member of the social networking service; and the method further comprises
preventing access to the stored audio annotation by a third device of the third member of the social networking service based on the received submission indicating that the audio annotation is not accessible by the third member.

12. The method of claim 1, wherein:
the spoken request includes a data request for a summary of the member profile of the second member of the social networking service;
the automatic selecting of the subset of the descriptors that describe the second member includes automatically generating the summary of the member profile of the second member; and
the causing of the device to present the automatically selected subset of the descriptors includes:
providing the automatically generated summary to the device; and
causing the device to present the automatically generated summary.

13. The method of claim 1, wherein:
the spoken request includes a data request for information specifying a most recent previous communication between the first member and the second member; and the method further comprises:
accessing a behavioral database that stores a record of the most recent previous communication between the first member and the second member; and
causing the device to present at least part of the record of the most recent previous communication between the first member and the second member.

14. The method of claim 1, wherein:
the spoken request includes a data request for information specifying a quantity of third members of the social networking service who are directly connected to both the first member and the second member within the social networking service; and
the method further comprises:
accessing a social graph database that stores a social graph specifying relationships among at least the third members of the social networking service; and
causing the device to present the quantity of third members who are directly connected to both the first member and the second member within the social networking service.

15. A non-transitory machine-readable storage medium comprising instructions that, when executed by one or more processors of a machine, cause the machine to perform operations comprising:
receiving a spoken request submitted by a first member of a social networking service, the spoken request being received via a network from a device of the first member and referencing a subject entity about whom information is sought by the first member;
determining a context for the spoken request based on a set of requests received previous to the spoken request;
identifying a plurality of members of the social networking service based on the spoken request and the context;
causing the device of the first member to present a representative descriptor for one or more members of the plurality of members, the representative descriptors for the one or more members being presented as a query responsive to the spoken request;
receiving a spoken response submitted by the first member, the spoken response indicating a selected representative descriptor;
based in part on the context and the selected representative descriptor, identifying a second member of the social networking service as the subject entity referenced by the spoken request, the second member being described by descriptors stored in a member profile maintained by the social networking service, the identifying of the second member being performed by a command interpreter module comprising one or more processors of the machine;
automatically selecting a subset of the descriptors from the member profile of the second member, the automatic selecting of the subset of the descriptors being based on the spoken request; and
causing the device of the first member to present the automatically selected subset of the descriptors from the member profile of the second member in response to the spoken request submitted by the first member;
wherein the identifying of the second member as the subject entity referenced by the spoken request includes:
identifying an email address of a person in the spoken request; and
determining that the email address of the person matches an identifier of the second member within event data that represents an event scheduled in a calendar application of the first member.

16. The non-transitory machine-readable storage medium of claim 15, wherein:
the causing of the device to present the automatically selected subset of the descriptors includes:
providing the device with a speech version of at least one descriptor among the automatically selected subset of the descriptors from the member profile the second member; and
causing the device to play the speech version of the at least one descriptor.

17. The non-transitory machine-readable storage medium of claim 15, wherein:
the identifying of the second member as the subject entity referenced by the spoken request includes:

identifying a name of a person in the spoken request; and disambiguating the name of the person based on social graph information that indicates relationships between members of the social networking service, the disambiguated name of the person corresponding to the second member.

18. A system comprising:

processors;

a user interface module comprising one or more of the processors and configured to receive a spoken request submitted by a first member of a social networking service, the spoken request being received via a network from a device of the first member and referencing a subject entity about whom information is sought by the first member;

a context module comprising one or more processors and configured to determine a context for the spoken request based on a set of requests received previous to the spoken request, identify a plurality of members of the social networking service based on the spoken request and the context, cause presentation of a representative descriptor for one or more members of the plurality of members, the representative descriptors for the one or more members being presented as a query responsive to the spoken request, and receive a spoken response submitted by the first member indicating a selected representative descriptor;

a command interpreter module comprising one or more of the processors and configured to identify, based in part on the context and the selected representative descriptor, a second member of the social networking service as the subject entity referenced by the spoken request, the second member being described by descriptors stored in a member profile maintained by the social networking service, the identifying of the second member being performed by a voice-user interface module comprising one or more processors of the machine;

a member profile presentation module comprising one or more of the processors and configured to automatically select a subset of the descriptors from the member profile of the second member, the automatic selecting of the subset of the descriptors being based on the spoken request; and the user interface module comprising one or more of the processors being further configured to cause the device of the first member to present the automatically selected subset of the descriptors from the member profile of the second member in response to the spoken request submitted by the first member;

wherein the user interface module is operable to automatically receive the spoken request when it is determined that the device of the first member is located in a moving vehicle.

19. The system of claim 18, further comprising:

the context management module further configured to:

identify a name of a person in the spoken request; and disambiguate the name of the person based on social graph information that indicates relationships between members of the social networking service, the disambiguated name of the person corresponding to the second member.

\* \* \* \* \*